United States Patent

Kusters et al.

[11] Patent Number: 6,027,546
[45] Date of Patent: Feb. 22, 2000

[54] PROCESS FOR DRYING COMPRESSED AIR

[75] Inventors: Arnoldus Petrus Maria Kusters, Etten-Leur; Bob Van Den Hoogen, Soest, both of Netherlands

[73] Assignee: Aquilo Gas Separation B.V., Etten-Leur, Netherlands

[21] Appl. No.: 09/022,458

[22] Filed: Feb. 12, 1998

[30] Foreign Application Priority Data

Feb. 21, 1997 [EP] European Pat. Off. .............. 97200490

[51] Int. Cl.[7] ........................... B01D 53/04; B01D 53/22; B01D 53/26

[52] U.S. Cl. .................... 95/52; 95/99; 95/113; 95/123; 96/8; 96/125; 96/126; 96/130

[58] Field of Search ................. 95/45, 52, 113, 95/117, 121–123; 96/4, 8, 10, 108, 125, 126, 130

[56] References Cited

U.S. PATENT DOCUMENTS

| | | | |
|---|---|---|---|
| 2,944,627 | 7/1960 | Skarstrom | 95/122 X |
| 2,993,563 | 7/1961 | Munters et al. | 96/125 X |
| 3,237,377 | 3/1966 | Skarstrom | 95/121 X |
| 3,708,956 | 1/1973 | Norbäck | 96/125 X |
| 3,735,558 | 5/1973 | Skarstrom et al. | 95/52 X |
| 3,735,559 | 5/1973 | Salemme | 95/52 |
| 4,718,921 | 1/1988 | Makino et al. | 95/52 |
| 4,857,081 | 8/1989 | Taylor | 95/52 |
| 4,931,070 | 6/1990 | Prasad | 95/52 |
| 4,934,148 | 6/1990 | Prasad et al. | 95/52 X |
| 4,961,759 | 10/1990 | Taylor | 95/52 |
| 5,004,482 | 4/1991 | Haas et al. | 95/52 |
| 5,034,025 | 7/1991 | Overmann, III | 95/52 |
| 5,067,971 | 11/1991 | Bikson et al. | 95/52 |
| 5,084,073 | 1/1992 | Prasad | 95/52 |
| 5,160,514 | 11/1992 | Newbold et al. | 95/52 X |
| 5,170,633 | 12/1992 | Kaplan | 95/123 X |
| 5,188,645 | 2/1993 | Fukuhori et al. | 95/113 |
| 5,205,842 | 4/1993 | Prasad | 95/52 X |
| 5,240,472 | 8/1993 | Sircar | 95/52 |
| 5,242,473 | 9/1993 | Ogasahara | 96/125 |
| 5,259,869 | 11/1993 | Auvil et al. | 95/52 |
| 5,447,559 | 9/1995 | Rao et al. | 96/10 X |
| 5,512,083 | 4/1996 | Dunne | 95/113 |
| 5,641,337 | 6/1997 | Arrowsmith et al. | 95/52 X |
| 5,843,209 | 12/1998 | Ray et al. | 95/52 |

FOREIGN PATENT DOCUMENTS

| | | |
|---|---|---|
| 0411254A1 | 2/1991 | European Pat. Off. . |
| 0411254B1 | 2/1991 | European Pat. Off. . |
| 2-241514 | 9/1990 | Japan ........................ 95/52 |

OTHER PUBLICATIONS

Ogasawara Yoshinari, JP3186315, Dehumidifier Device (Abstract), Aug. 1991.

Primary Examiner—Robert H Spitzer
Attorney, Agent, or Firm—Handal & Morofsky

[57] ABSTRACT

A compressed air drying apparatus employs a hollow fiber membrane dryer to provide a compressed air stream having a low dew point for outdoor use. Energy efficiency is obtained by purging water vapor from the hollow fiber membrane dryer with an adsorption-dried atmospheric air flow and by using a portion of the atmospheric air flow to regenerate the adsorption drying medium, preferably with heat from the compressor.

23 Claims, 2 Drawing Sheets

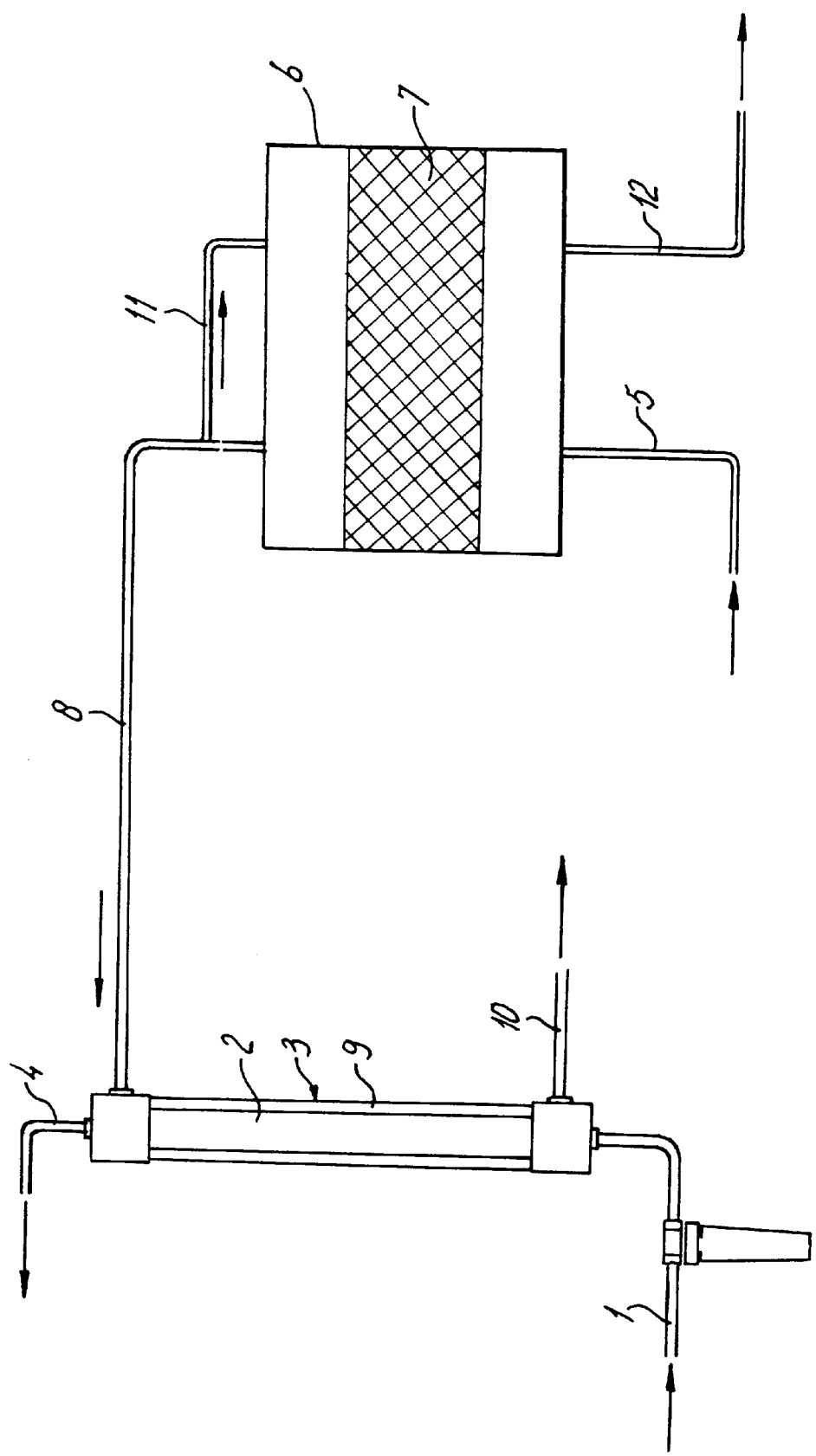

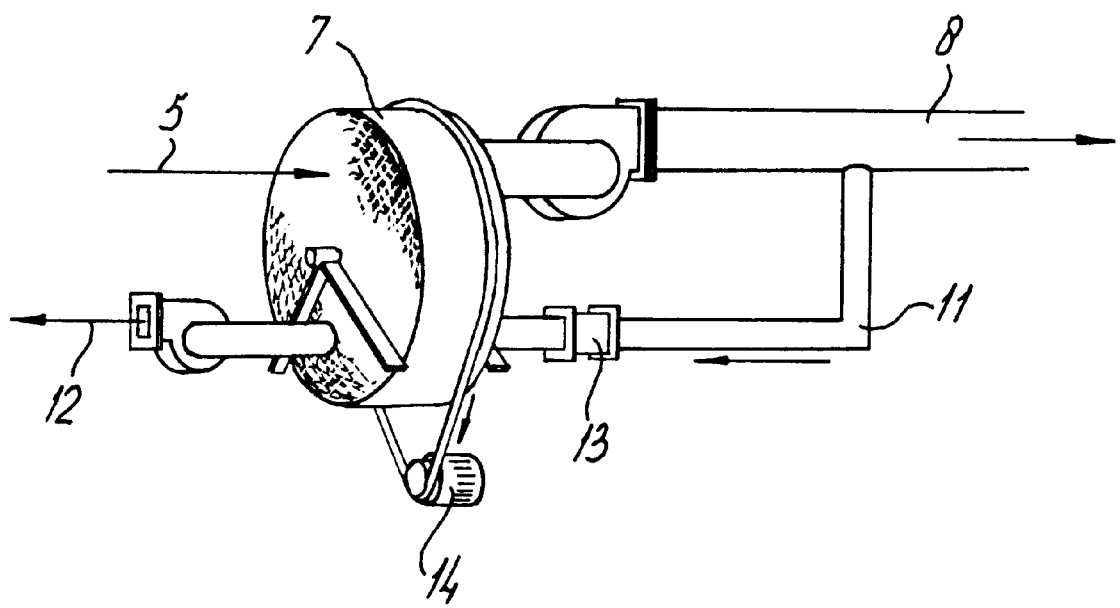

PROCESS FOR DRYING COMPRESSED AIR

BACKGROUND

Compressed air which leaves a compressor is always wet and consequently will cause many inconveniences. For that reason compressed air dryers have been developed.

The first technology (about 1920) made use of the adsorption technology resulting in dried compressed air having a dew point of −20° C. or lower, for instance −30° C. or even −40° C. Typical adsorbents were porous materials having a high internal surface area on which the water vapour was absorbed. In this respect it is notable that the water absorbed by the adsorbents can be removed in a regeneration step by passing expanded compressed air over the adsorbent or directing a flow of very hot (±200° C.) air over the adsorbent.

The adsorption drying of compressed air was carried out by two main types of systems, based on the two ways of regenerating the saturated adsorbent i.e. with heat and without heat. Hot air drying systems used electrical heat or steam for regenerating the water saturated adsorbent. In this respect there are two types of heating, i.e.

- the "Blower type" system comprising a dryer having an external heater and a ventilator, and
- the "Internal Heater" system comprising a dryer based on an internal heater and purge air for removing the desorbed water.

More widely used are the so-called heatless systems, according to which a part of the dried air compressed is expanded and used for regeneration of the adsorbent. More particularly the principle of the heatless system can be explained as follows.

The drier is built with two pressure vessels, filled with an adsorbent (aluminium oxide or silica gel). The compressed air is led through one of the adsorber vessels to be dried. After drying, a part of the dried compressed air, in general 15%, is expanded to atmospheric conditions and then led through the second adsorber vessel in opposite flow direction. This dried expanded air will remove the absorbed water from the absorbent present in the second vessel. After every 2–5 minutes, the so-called cycle time, the flow of compressed air is changed from the first vessel to the second vessel wherein the compressed air is dried by the regenerated absorbent whereas the first vessel is now brought to atmospheric conditions and generated in the way, described above for the second vessel. Through interconnecting piping and valves the change over every 2–5 minutes is realized.

Compared to the above-described heat generated airdriers the heatless system has the advantage of being simple in operation. However, a disadvantage of the heatless system is found in the high operation costs, due to the use of 15% of the expensive compressed air for regeneration purposes of the adsorbents. Moreover each changeover of a pressure vessel under pressure to atmospheric pressure by blowing off compressed air incurs in a further loss resulting in a total loss of about 17% of the compressed air.

A second technology was developed in the early sixties. This technology uses a refrigeration system for cooling the compressed air to 3–5° C. Thereafter the water was removed by means of a water separator. The obtained cold air is reheated by means of heat exchange with the warm incoming compressed air. However, these second technology systems do result in compressed air having a dew point of +3° C., which is considered disadvantageous on account of the freezing of the water in such dried compressed air.

A third technology, i.e. the membrane technology, came up in the 1990's. The principle of this third technology may be elucidated as follows.

Wet compressed air is fed into a bundle of hollow fibers and is passed down the inside of said hollow fibers. The hollow fibers are present in a module. The water vapour passes the selective membrane wall much faster than air and the permeated water vapour is collected in the module shell. The driving force for this process is provided by the compressed air which flows on the permeate or shell side of the membrane wall. Further the permeated water vapour is preferably removed by means of a purge gas, for instance expanded compressed air, which is fed into the shell-side of the hollow fiber membrane module. This type of high selective membrane dryer may reach dew points of −60° C. depending on the compressed air loss which is normally between 15% and 40% of the incoming compressed air. Further it is also possible to apply a vacuum pump at the shell-side of the hollow fiber membrane module for exhausting the water vapour, permeated through the hollow fibers. However, such an embodiment requires the use of an extra exhaust system i.e. a vacuum pump.

Summarizing it is stated that the above-discussed adsorption technology and the current membrane technology are the only technologies which can reach dew points lower than the freezing point, i.e. below 0° C. Such a low dew point is a requisite if compressed air has to be used in outside environment application. In case the outside temperature may reach values below 0° C. the water in compressed air having a dew point above 0° C. will freeze and may cause corrosion and damage to the installation. However, both above technologies have the disadvantage of a high energy consumption, to be attributed to the loss of compressed air or the use of large electric heaters for heating the air for regenerating the adsorbents.

In view of the above it is referred to Derwent Publications Ltd., London, GB; Class J01, AN 91-225721. According to said reference water vapour containing gas is dehumidified by means of a gas-separator comprising a gas separation membrane. More in particular the water vapour containing gas is supplied in compressed state on one side of said membrane and simultaneously a compressed air in expanded state is supplied counter-currently as purge gas on the other side of said membrane. However, the use of compressed air in expanded state as a purge gas is rather expensive and therefore uneconomical.

Further, U.S. Pat. No. 5,240,472 relates to a process for the removal of moisture from a moisture laden gas stream, utilizing both a membrane dryer and an adsorption dryer. According to this known process the membrane dryer, comprising a very specific water vapour permeating membrane, is used as a "predryer", whereas the adsorption dryer is used as the "final dryer". The purge gas for the membrane dryer unit is a nearly moisture-free waste gas, typically waste nitrogen from a cryogenic air separation plant (column 5, lines 27–29).

BRIEF SUMMARY OF THE INVENTION

The aim of the invention is to develop a process and an apparatus respectively for drying compressed air to a dew point of less than 0° C., preferably less than −10° C. or even −20° C. at a low energy consumption.

The aim of the invention is achieved by a process which is characterized by

- introducing compressed air into one end of a hollow fiber membrane unit, which membrane is selective for water vapour permeation;
- introducing dry purge air, coming from an atmospheric adsorption dryer, into the permeate- or shell-side of the hollow fiber membrane unit;

introducing dry purge air, coming from the same atmospheric adsorption dryer as above, into the regeneration inlet of said atmospheric adsorption dryer; and collecting the dried compressed air at the other end of the hollow fiber membrane unit as well as discharging the applied purge air.

Above system according to the invention represents an advantageous compressed air dryer system which has hardly any loss of compressed air and requires much less energy compared with the current technologies.

BRIEF DESCRIPTION OF THE DRAWINGS

Some embodiments of the invention are described in detail below, by way of example, with reference to the accompanying drawings, in which:

FIG. 1 is a schematic view of a compressed air drying apparatus according to one embodiment of the invention; and FIG. 2 is a perspective view of an atmospheric adsorption dryer which can be used in the compressed air drying apparatus shown in FIG. 1.

DESCRIPTION OF THE PREFERRED EMBODIMENTS

The table below, illustrates the total specific energy consumption KW/Nm³ of dried air in four prior art processes and in two processes according to the invention. As may be seen from the Table, the total specific energy consumption is dramatically and surprisingly lower in the case of the embodiments of the invention than is the case in the prior art embodiments.

nitrogen. Examples of such selective membranes are generally known in the art having $H_2O/O_2$ selectivities higher than 100.

Further the ratio of the specific surface of the hollow fiber membrane and the flow of compressed air may range between wide limits. Generally this ratio ranges between 0,01–0.5 m² per m³ of compressed air (pressure of compressed air: 1–16 bar).

The atmospheric adsorption dryer comprises a housing, provided with inlet and outlet openings and an adsorption wheel. The atmospheric adsorption dryer is known per se from the prior art. Examples of such atmospheric adsorption dryers are the marketed products Munster, Flair and Bry-Air.

More in particular the process and apparatus respectively according to the invention may be illustrated by FIG. 1:

Compressed air leaving a compressor is fed through line (1) into the hollow fiber membrane (2) present in housing (3). The dried compressed air leaves the hollow fiber membrane (2) through line (4) at the top of the housing (3).

Atmospheric air is fed through line (5) in the housing (6) of the atmospheric adsorbent dryer comprising an adsorbent wheel (7). The dried atmospheric air leaves the atmospheric adsorption dryer and is led in the form of purge air through line (8) in the shell-side (9) of the hollow fiber membrane housing (3). Finally the purge air is removed through line (10) and discharged into the open air. A part of the air (11) coming from said atmospheric adsorption dryer is led into the regeneration inlet of the atmospheric adsorption dryer.

The main driving force for the system according to the invention is created by the atmospheric air dryer which provides a flow of dried atmospheric air as purge air in the shell-side (9) of the hollow fiber membrane unit.

TABLE

| Type of dryer | Capacity NM³/hr (introduced compressed air)*) | Purge air Nm³/hr | % of purge air, based on compressed air | Energy consumption of purge air in kW | Energy consumption in kW (electric) | Total specific energy consumption kW/Nm³ of dried air | Dew point ° C. | Elucidation |
|---|---|---|---|---|---|---|---|---|
| Blower type system (prior art) | 317 | 1.0 | 0.3 | 4.0 | 0.1 | 0.013 | −40° C. | Dryer with ventilator and heater |
| Internal Heater system (prior art) | 317 | 10.5 | 3.3 | 2.3 | 1.2 | 0.0114 | −20° C. | Dryer with internal heater and purge air |
| Heatless system (prior art) | 317 | 57 | 18 | 0 | 6.7 | 0.0258 | −20° C. | Dryer with cold purge air |
| MV (prior art) | 317 | 15.8 | 5 | 2.2 | 1.9 | 0.0136 | −20° C. | Membrane with vacuum pump 0.2 bar |
| M6 | 317 | 1.6 | 0.5 | 2.1 | 0.2 | 0.0073 | −20° C. | Membrane with atmospheric dryer |
| M6 (NAK) | 317 | 1.6 | 0.5 | 0 | 0.2 | 0.00063 | −20° C. | Membrane with atmospheric dryer + air/air heat exchange**) |

*)For 317 Nm³/hr a 37 kW compressor is needed
**)Using heat of compressor

Depending on the inventive system embodiments the energy consumption, based on units of dried air is 50% up to 80% lower than the current prior art technologies. Further the loss of compressed air is generally at most 5%, preferably less than 3% and most preferably at most 1%, based on the inlet flow of the compressed air.

The hollow fiber membrane used in the process according to the invention is very selective for water vapour, i.e. the hollow fiber membrane has a high permeate rate for water vapour compared to the permeate rates for oxygen and An example of an atmospheric air dryer (6) marketed by the firm Munters Nederland B. V., the Netherlands, is illustrated in FIG. 2. The atmospheric air is fed through line (5) in the adsorbent wheel (7) rotated by driving motor (14). The dried atmospheric air leaves the dryer by means of line (8). A part of said dried atmospheric air is used as regeneration air (11), which—after optionally passing a heating means (13) like an external heater or heat exchange means— is led into the regeneration inlet of the atmospheric adsorption dryer. After passing the adsorption wheel (7) the humidified air is discarded through line (12).

In case the atmospheric adsorption dryer (6) is saturated with ambient air humidity the adsorption wheel (7) can be regenerated by introducing ambient air heated up to for instance 130° C. through line (11). Said heated air may be obtained by applying external heat or by using heat generated by the compressor, i.e. by means of heat exchange between the dried compressed air and ambient air. After passing the adsorption wheel the air is removed through line (12).

For regenerating the adsorption wheel (7) it is also possible—but not recommended—to apply a small amount of the dried compressed air. After decompression the dried air is led through line (11) into the atmospheric adsorbent dryer and removed through line (12). Further a combination of above two methods may be used for regenerating the adsorbent wheel (7).

The following example, illustrates the present invention, but does not limit the scope of the invention.

EXAMPLE

Compressed air leaving a compressor at a pressure of 7 bar and a temperature of 35° C., i.e. 10° C. above the ambient temperature of 25° C., is used as feed for a hollow fiber membrane drier. The relative humidity of the ambient air is 50%, so the ambient dew point is 15° C. For the sake of clarity it is brought to the fore that a cubic meter of the compressed air, having a dew point of 35° C., contains 4 times the amount of water vapour present in a cubic meter of ambient air.

The compressed air having a dew point of 35° C. is fed with a flow rate of 317 Nm$^3$/hr through line (1) of FIG. 1 into a hollow fiber membrane (2) having a specific surface of 48 m$^2$. The dried compressed air, removed through line (4) has a dew point of −20° C.

Atmospheric air having a dew point of 15° C. is introduced through line (5) in an atmospheric drier (6) comprising an adsorbent wheel (7) ("Munters Nederland B.V."). The dried atmospheric air removed through line (8) has a dew point of −25° C. and is used as purge air for the hollow fiber membrane drier (3). The purge air is introduced in the permeate or shell-side (9) of the hollow fiber membrane drier (3) and is removed through line (10) as air having a dew point of 27° C.

This dew point of 27° C. is 12° C. higher than the dew point of the ambient air. This means that the air having a dew point of 27° C. contains 60% more water vapour than the ambient or outside air.

In view of the above it is stated that by using outside air the system according to the invention is very efficient as the atmospheric adsorbtion dryer removes only the moisture in the outside air. This moisture amount in the outside air is only 50% of the water vapour removed from the compressed air leaving the hollow fiber membrane drier.

Referring to the system according to the invention it is emphasized that the system automatically creates a constant dryness, independently the outside conditions, as it will always remove more than 95% of the moisture in the compressed air.

to illustrate the above assertion two situations (in winter—and summer time) will be considered:

winter time: the outside temperature is 3° C. and the dew point of the outside air is −5° C. The compressed air has a dew point of 25° C. (pressure 7 bar). The system as illustrated in FIG. 1 will remove 98% of the moisture, so the dew point of the dried compressed air is −27° C.

summer time: the outside temperature is 25° C. and the dew point of the outside air is 15° C. The compressed air has a dew point of 35° C. (pressure 7 bar). The system as illustrated in FIG. 1 will remove 95% of the moisture, so the dew point of the dried compressed air is −7° C.

Summarizing the above, in both situations the compressed air produced according to the invention has a relative humidity of less than 5%, which is considered very dry.

We claim:

1. A process for drying compressed air employing a hollow fiber membrane unit and an atmospheric adsorption dryer, wherein the membrane unit has one and another ends for respectively admitting and discharging the compressed air and has a hollow fiber membrane, the membrane being selectively permeable to flow of water vapor from a compressed air side of the membrane to a permeate side of the membrane, and wherein the atmospheric adsorption dryer provides, from atmosphere, dry purge air for the membrane unit and has a regeneration inlet, the process comprising:

a) introducing compressed air into the one end of the membrane unit;

b) introducing a first flow of dry air from the atmospheric adsorption dryer into the permeate side of the membrane unit to purge the membrane unit;

c) introducing a second flow of dry air from the atmospheric adsorption dryer into the regeneration inlet of the atmospheric adsorption dryer;

d) collecting dried compressed air from the other end of the membrane unit, and e) discharging the purge air from the membrane unit.

2. The process according to claim 1 wherein the process comprises heating the second flow of dry air flowing to the regeneration inlet of the atmospheric adsorption dryer.

3. The process according to claim 2 wherein the heating of the second flow of dry air employs heat generated by a compressor producing the compressed air.

4. The process according to claim 2 comprising exchanging heat between the dry compressed air and the second flow of dry air.

5. The process according to claim 1 wherein air is drawn into the atmospheric adsorption dryer directly from atmosphere, without treatment.

6. The process according to claim 1 wherein, in step b), the first flow of dry air is drawn from the atmospheric adsorption dryer and admitted to the permeate side of the membrane unit without being compressed and without applying vacuum.

7. The process according to claim 1 wherein the atmospheric adsorption dryer comprises a rotating adsorption wheel, the process comprising leading the first flow of dry air away from one side of the adsorption wheel and leading the second flow of dry air through the regeneration inlet to the other side of the adsorption wheel.

8. The process according to claim 1 wherein the inlet pressure of the compressed air to the membrane unit is 1–16 bar, the flow of the purge gas at the permeate side of the membrane unit is countercurrent to the flow of the compressed air and the atmospheric adsorption dryer comprises a rotating adsorption wheel the process comprising leading the first flow of dry air away from one side of the adsorption wheel and leading the second flow of dry air through the regeneration inlet to the other side of the adsorption wheel.

9. The process according to claim 1 wherein the dried compressed air output from the membrane unit has a dew point less than 0° C., optionally less than −10° C.

10. The process according to claim 1 wherein the first flow of dry air has a flow rate through the membrane unit which is less than the flow rate of the compressed air through the membrane unit, optionally less than about 18 percent of the flow rate of the compressed air.

11. The process according to claim 1, wherein the loss of compressed air is at most 5%, based on the inlet volume of the compressed air in the hollow fiber membrane unit.

12. The process according to claim 11, wherein the loss of compressed air is at most 3%, based on the inlet volume of the compressed air in the hollow fiber membrane unit.

13. The process according to claim 1, wherein the loss of compressed air is at most 1%, based on the inlet volume of the compressed air in the hollow fiber membrane unit.

14. The process according to claim 1, wherein at least 95% of the water content of the compressed air is removed.

15. The process according to claim 1, wherein the inlet pressure of the compressed air to the membrane unit is 1–16 bar.

16. The process according to claim 1, wherein the flow of the purge gas at the permeate side of the membrane unit is countercurrent to the flow of the compressed air.

17. A process for drying compressed air comprising:
   a) compressing air to provide a compressed air stream;
   b) passing the compressed air stream through a hollow fiber membrane dryer unit at an inlet pressure of from 1–16 bar whereby the compressed air pressure selectively drives water vapor through the membrane to dry the compressed air;
   c) passing a flow of dry, uncompressed atmospheric air from an atmospheric adsorption drier to the membrane dryer unit to purge the membrane dryer unit;
wherein the dry atmospheric air has a normalized flow rate through the membrane dryer unit, which is less than the normalized flow rate of the compressed air through the membrane dryer unit.

18. The process according to claim 17 wherein atmospheric air flow rate is less than about 18 percent, optionally less than about 5 percent of the flow rate of the compressed air.

19. The process according to claim 18 wherein the dried compressed air output from the membrane unit has a dew point less than 0° C., optionally less than −10° C.

20. The process according to claim 19, wherein the loss of compressed air is at most 5 percent, optionally at most 3 percent, based on the inlet volume of the compressed air in the hollow fiber membrane unit.

21. An apparatus for drying compressed air, the apparatus comprising:
   a) at least one hollow fiber membrane compressed air dryer unit having a compressed air side and a permeate side;
   b) at least one atmospheric adsorption dryer having a dry air outlet; and
   c) a connection between the dry air outlet of the atmospheric adsorption dryer and the permeate side of the membrane unit to supply dry air from the atmospheric adsorption dryer.

22. An apparatus according to claim 21 wherein the atmospheric adsorption dryer has a regeneration inlet and wherein the apparatus further comprises a connection from the dry air outlet of the adsorption dryer to the regeneration inlet for the flow of dry air to the regeneration inlet.

23. An apparatus according to claim 21 comprising a compressor to generate the compressed air and a heat exchanger to transfer heat from the compressor to air flowing to the regeneration inlet of the atmospheric adsorption dryer.

* * * * *